United States Patent

[11] 3,556,141

| [72] | Inventor | Hobart M. Hind |
| --- | --- | --- |
| | | 2604 Bruce Ave, Panama City, Fla. 32401 |
| [21] | Appl. No. | 783,897 |
| [22] | Filed | Dec. 16, 1968 |
| [45] | Patented | Jan. 19, 1971 |

[54] FLUID-OPERATED DISPENSING DEVICE
3 Claims, 1 Drawing Fig.

| [52] | U.S. Cl. | 137/564.5 |
| --- | --- | --- |
| [51] | Int. Cl. | G05d 11/00 |
| [50] | Field of Search | 137/101.11, 564.5 |

[56] References Cited
UNITED STATES PATENTS

| 1,875,022 | 8/1932 | Kluegel | 137/564.5 |
| --- | --- | --- | --- |
| 2,618,510 | 11/1952 | Mills | 137/564.5 |
| 2,932,317 | 4/1960 | Klosse | 137/564.5 |
| 3,220,435 | 11/1965 | Ellingson | 137/564.5 |
| 3,392,753 | 7/1968 | Kleinmann | 137/564.5 |

*Primary Examiner*—William R. Cline
*Attorney*—Newton, Hopkins & Ormsby

ABSTRACT: This invention relates to a device for feeding liquid fertilizer to a flowing stream of water. The fertilizer container is flexible and is placed in a housing having a pressure connection upstream of a metering venturi. The metering venturi causes a pressure drop in the fluid stream to cause the fertilizer to be ejected into the stream due to the pressure differential through an adjustable metering valve.

PATENTED JAN 19 1971

3,556,141

INVENTOR.
Hobart M. Hind

BY Newton, Hopkins
& Ormsby
Attorneys

FLUID-OPERATED DISPENSING DEVICE

SUMMARY

It is an object of this invention to provide a dispensing device which utilizes the venturi principle to cause liquid fertilizer to be dispensed from a container into a flowing stream.

A further object of this invention is to provide a dispensing device which utilizes the pressure of a flowing stream to assist in forcing liquid fertilizer from a flexible container through a metering valve into the flowing stream.

Another object of this invention is to provide a dispensing device capable of using a plastic throwaway liquid fertilizer container.

A still further object of this invention is to provide a liquid fertilizer container having at least two openings and including a flexible interliner located in the container between the two openings for dividing the container into two cavities.

Another object of this invention is to provide a dispensing device which is compact, simple of construction and assembly and economical to produce.

To the accomplishment of the foregoing and related ends and objects, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts:

BRIEF DESCRIPTION OF THE DRAWINGS

The FIG. is a side elevation of the dispensing device with certain parts broken away and shown in section for purposes of clarity.

DESCRIPTION OF THE ILLUSTRATIVE EMBODIMENT

Figure 1:
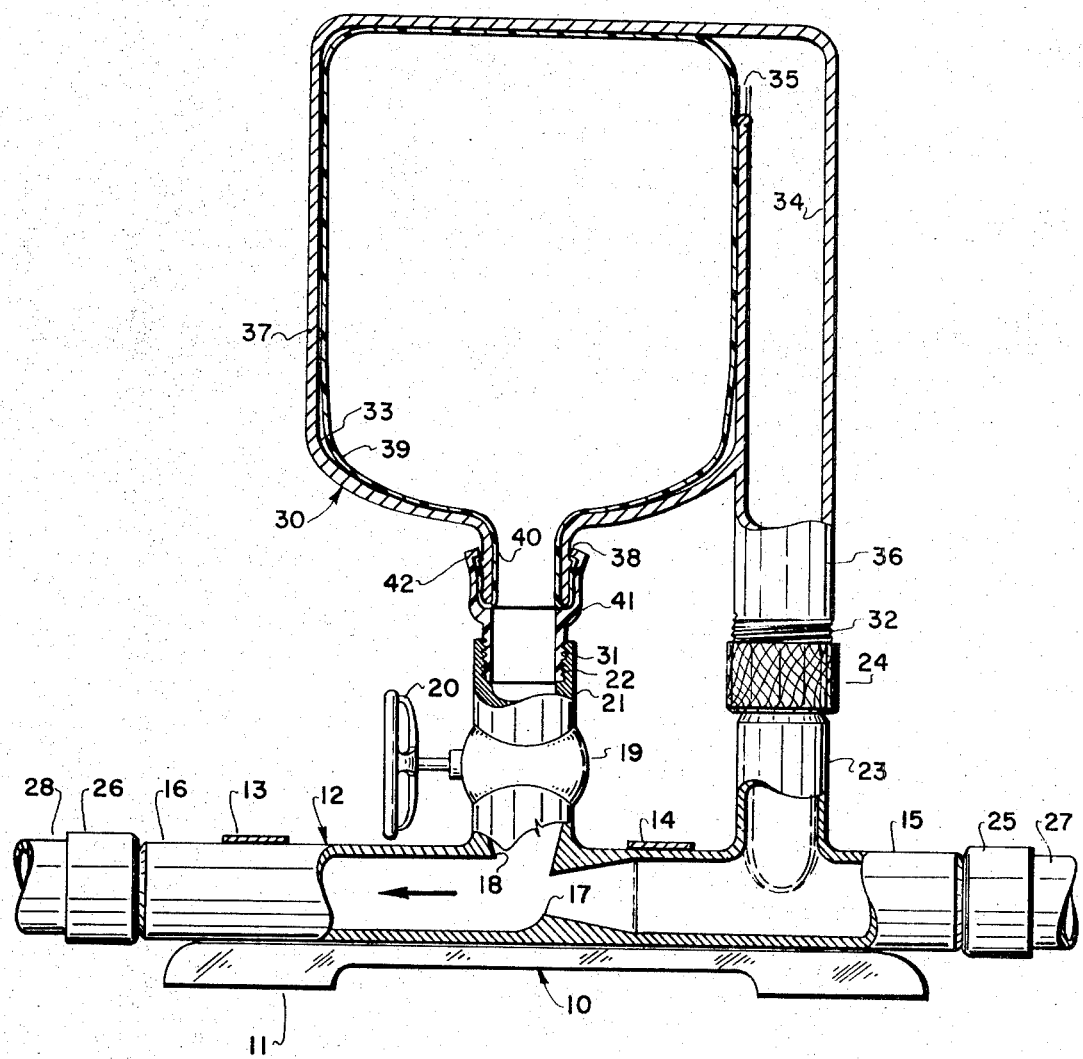

Referring now to the FIG. of drawing, the dispensing device 10 includes a base support means 11 which supports a dispensing conduit 12 in a substantially horizontal position. The dispensing conduit is connected to base support 11 by a pair of connecting straps 13, 14. Dispensing conduit 12 is provided with inlet and outlet passages 15, 16, respectively. A venturi 17 is provided in the dispensing conduit intermediate inlet passage 15 and outlet passage 16.

A liquid dispensing opening 18 is formed in dispensing conduit 12 downstream from venturi 17, or on the left of venturi 17 as shown in the drawing. Communicating with dispensing conduit 12 through opening 18 is a conventional metering valve 19 having a control handle 20. The projected end 21 of metering valve 19 is provided with an internally threaded opening 22. An upstanding nipple 23 is provided on the dispensing conduit 12 upstream of venturi 17, or on the right of venturi 17 as shown in the drawing. The projected end of nipple 23 terminates in an internal threaded connection 24. Inlet and outlet passages 15, 16 are provided with conventional connecting means 25, 26 which are adapted to be connected to a fluid supply line 27 and discharge line 28, respectively.

A liquid fertilizer container 30 is supported on the dispensing device 10 by means of a pair of external threaded connections 31, 32 which are threaded into connection 22, 24, respectively. Container 30 includes a first cavity portion 33 and a second cavity portion 33 through an 34. Cavity portion 34 is in flow communication with cavity portion 33 35. The projected end of cavity portion 34 terminates in a tubular shaped pipe means 36 having external threads 32. First cavity portion 33 takes the shape of a liquid fertilizer containing body 37 provided with a reduced neck element 38. A flexible interliner 39 is provided inside liquid fertilizer container body 37 which terminates in a reduced neck portion 40 extending around and overlapping neck element 38. A cap element 41 including a snap fit means 42 is placed over neck element 38 and overlapping portion 40 of the interliner to trap the interliner neck portion 40 therebetween. The projected end of cap element 41 is provided with external threads 31 for either receiving a conventional closure cap (not shown) or the threading into connection 22 on the dispensing device.

In operation, the liquid fertilizer container 30 having liquid fertilizer trapped in first cavity portion 33 by interliner 39 is placed on the dispensing device in an inverted position through connections 22, 24. The dispensing device 10 having been placed in communication with fluid pressure supply line 27 will thus have fluid under pressure forced through venturi 17 causing a pressure drop on the downstream side of venturi 17 or (just to the left of venturi 17 as shown in the drawing) adjacent dispensing opening 18. By opening metering valve 19, liquid fertilizer in the supply container 30 will be ejected into the flowing stream through opening 18 due to the venturi caused pressure drop. Fluid under pressure in the inlet passage 15 will also be forced up through nipple 23, through the second cavity portion 34 and into the first cavity portion 33 to thereby place pressure on the exterior of the flexible interliner 39 to assist in forcing the liquid fertilizer from the flexible interliner through metering valve 19 into the flowing stream at dispensing opening 18. The additional assist of the fluid pressure on the exterior of the flexible interliner 39 is provided by having a flow connection upstream of the venturi 17 and this additional pressure assist will offset any back pressure due to friction losses in the discharge line 28.

It will now appear that there has been provided an improved dispensing device that attains the several objects set forth above in a thoroughly practical and efficient manner.

As different embodiments of the invention are possible and as many changes may be made in the embodiment disclosed, all without departing from the scope of the invention, it is to be understood that the foregoing should be interpreted as illustrative and not in a limiting sense.

I claim:

1. A dispensing device for dispensing liquid into a flowing stream comprising:

a. a support;

b. a dispensing conduit comprising a straight tubular member mounted horizontally on said support and having inlet and outlet passages;

c. means connecting said inlet and outlet passages to a supply line and a discharge line respectively;

d. a venturi passage formed in said dispensing conduit intermediate said inlet and outlet passages;

e. a dispensing opening formed in said dispensing conduit downstream of and adjacent said venturi opening;

f. a metering valve formed integral with said dispensing conduit and located immediately above said dispensing opening;

g. a nipple conduit means integral with said dispensing conduit, opening into said conduit upstream of said venturi and extending vertically upward, said nipple and said valve terminating at substantially the same level;

h. a liquid material supply container having first and second cavity portions communicating through an opening adjacent the top of said container, said top being closed, said first cavity portion terminating in a downwardly extending reduced neck portion and said second cavity portion terminating in a downwardly extending tubular-shaped pipe means;

i. means for rigidly connecting said reduced neck portion and tubular shaped pipe means to said metering valve and nipple conduit means respectively, whereby said container will be supported in fixed position on said dispensing conduit;

j. an interliner in the form of a flexible container terminating in a reduced neck portion of a size corresponding to that of the neck portion of said first cavity portion and located within said last mentioned neck portion; and k. whereby liquid entering the second cavity portion through the nipple conduit means will pass upwardly through the second cavity portion and the said opening adjacent the top of the container and will exert pressure on the outside of the flexible interliner.

2. A dispensing device as in claim 1 wherein the neck portion of said flexible interliner extends around and overlaps the neck portion of said first cavity portion.

3. A dispensing device as in claim 2 wherein a cap element surrounds the said neck portions holding the overlapping neck portion of the flexible interliner in position, said cap element having a threaded end adapted to be connected with the said metering valve or, alternatively, for receiving a closure cap.